(12) United States Patent
Harada

(10) Patent No.: US 6,541,958 B2
(45) Date of Patent: Apr. 1, 2003

(54) ROTATION DETECTING DEVICE

(75) Inventor: Yasuhiro Harada, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/915,392

(22) Filed: Jul. 27, 2001

(65) Prior Publication Data

US 2002/0014888 A1 Feb. 7, 2002

(30) Foreign Application Priority Data

Jul. 31, 2000 (JP) ........................................ 2000-231651

(51) Int. Cl.⁷ ................................ G01P 3/48; G01B 7/30
(52) U.S. Cl. .................... 324/174; 324/207.25; 384/448
(58) Field of Search .............................. 324/173, 174, 324/207.15, 207.25; 310/168; 384/448

(56) References Cited

U.S. PATENT DOCUMENTS

| | | | | |
|---|---|---|---|---|
| 5,547,290 A | * | 8/1996 | Ouchi et al. ................ | 384/448 |
| 5,602,335 A | * | 2/1997 | Ouchi ........................ | 73/494 |
| 5,760,576 A | * | 6/1998 | Ouchi | |
| 5,967,669 A | * | 10/1999 | Ouchi ........................ | 384/448 |
| 6,011,388 A | * | 1/2000 | Miyazaki et al. ............ | 324/174 |
| 6,053,046 A | | 4/2000 | Masaki et al. ........... | 73/514.39 |

FOREIGN PATENT DOCUMENTS

| | | |
|---|---|---|
| JP | A-8-248049 | 9/1996 |
| JP | A-9-196948 | 7/1997 |
| JP | 09-311054 | * 12/1997 |

* cited by examiner

*Primary Examiner*—Edward Lefkowitz
*Assistant Examiner*—Reena Aurora
(74) *Attorney, Agent, or Firm*—Law Offices of David G. Posz

(57) ABSTRACT

A rotation detecting device has various portions that are covered with a resin-molded section. After integrally molding the first and second cores 8 and 9, permanent magnet 10, and terminal 14 within a resin-molded section 11, a coil 12 is wound in a slot section 11a formed in the resin-molded section 11. Then, of the resin-molded section 11, the coil 12 and the terminal 14 are electrically connected in a recess formed at an outer periphery of the resin-molded section. Accordingly, the coil 12 is not liable to be damaged by a contact of a high-temperature, high-pressure resin during the molding process.

12 Claims, 5 Drawing Sheets

ROTATION DETECTING DEVICE

CROSS REFERENCE TO RELATED APPLICATION

This application is based upon Japanese Patent Application No. 2000-231651, filed on Jul. 31, 2000, the contents of which are incorporated herein by reference.

BACKGROUND OF THE INVENTION

1. Field of the Invention

This invention relates to a rotation detecting device which electromagnetically detects the rotating state of a rotating body to be detected, by the use of a rotor in accordance with the rotation of the rotating body to be detected.

2. Description of Related Art

There has been conventionally known a rotation detecting device, as disclosed in Japanese Patent Laid-Open No. Hei 9-196948, which electromagnetically detects the state of rotation of a rotating body to be detected, on the basis of a rotor rotating in accordance with the rotation of the rotating body to be detected.

The rotation detecting device is for detecting the rotation of a rotor having a number of alternately arranged portions of different magnetic reluctance. This device has a sensor body comprising such components as a core and a permanent magnet forming a closed magnetic circuit including a part of the rotor in a part of a magnetic circuit, an electromagnetic coil which converts a change of magnetic flux quantity in the closed magnetic circuit to an alternating current, and a spool wound with the electromagnetic coil.

The sensor body is integrally formed by injection-molding each of these components and a terminal as an output terminal of the sensor after installation of each component (the core, the permanent magnet, and the spool wound with magnetic coil).

In forming the sensor body, however, the electromagnetic coil contacts a high-temperature and high-pressure resin during a secondary molding (injection molding) process, and therefore there arises such a problem that the electromagnetic coil may be damaged. That is, the electromagnetic coil may be broken by the resin pressure and the fluid pressure during the injection molding. Furthermore, after the secondary molding, the magnetic coil repetitively undergoes, with ambient temperature changes, a thermal stress resulting from a difference in the coefficient of linear thermal expansion between resin and copper as a coil material. Particularly, when the rotation detecting device is applied to a vehicle wheel speed sensor used in vehicle brake control, it is conceivable that an excessive stress will be repetitively applied to the electromagnetic coil because of a large change in an ambient temperature.

As methods for solving the above-described problem, the electromagnetic coil is coated with a silicone material or is covered with a soft material. These methods, however, separately require a winding protective material for covering the electromagnetic coil.

Besides, the resin molding process for molding the sensor body is needed at least two times, which will inevitably increase the cost.

SUMMARY OF THE INVENTION

In view of these and other problems associated with the prior art, an object of this invention is to prevent giving damage to the electromagnetic coil even when no winding protective member is needed. Another object of this invention is to provide a sensor structure which is capable of forming the sensor body by a single time of resin molding.

According to first aspect of this invention, the rotation detecting device includes a sensor body and a cover section. The sensor body comprises a magnetic path portion for changing, in response to the rotation of a rotating body to be detected, magnetic reluctance by a rotary switch section in which portions of different magnetic reluctance alternately change; a magnet which produces a magnetic flux in the path of magnetic flux; an electromagnetic coil which generates the electric current in accordance with a change in the magnetic flux in the path of magnetic flux; and an electrical connection portion for connection with the electromagnetic coil. The cover serves as a lid with a bottom face and holds the sensor body. The magnetic flux path, the magnet, and the output terminal are molded in a resin-molded section. The electromagnetic coil is wound in a slot section formed in the outer periphery of the resin-molded section. In a part of arrangement of an electrical connection portion between the electromagnetic coil and the output terminal, a recess is formed in the resin-molded section and the electrical connection portion is exposed out of the resin-molded section.

In the above-described configuration that the electromagnetic coil is wound in the slot section formed in the resin-molded section after molding the magnetic flux path, magnet, and output terminal in the resin-molded section, it is possible to dispense with molding to be performed after winding the electromagnetic coil and accordingly to dispense with the winding protective member without giving damage to the electromagnetic coil.

It is preferable that the magnetic flux path is composed of a first and second cores of a disk shape, thereby allowing the location of the slot section between the first and second cores.

It is preferable that a connector section formed partly projecting is provided in the resin-molded section; the output terminal is provided at the connector section; and in the part of formation of the connector section, a projecting portion projecting in a direction of insertion into the cover in the outer periphery of the resin-molded section is not formed at a portion where the connector section is formed in the resin-molded section, and a recess be formed in this portion.

Thus, the recess is formed at the portion in the part of the resin-molded section where the connector section is formed, it is possible to electrically connect the electromagnetic coil with the output terminal through the recess. Accordingly the components can be integrally formed by a single time of resin molding.

It is preferable that the sensor body is pressed and fixed in the cover. It is possible to thus press into and fix the sensor body to the cover.

It is preferable that the sensor body is pressed into the cover through a metal ring member provided in the outer peripheral portion of the resin-molded section. It is preferable that a flange-shaped portion is formed at the outer periphery of the resin-molded section, and is projecting in the direction of outer periphery of the resin-molded section, and the ring member is disposed in the flange-shaped portion.

It is preferable that a plurality of projections projecting in the direction of outer periphery of the flange-shaped portion are formed in the flange-shaped portion. On the plurality of projections are pressed ring members, thereby reducing the contact surface area of installation of the ring member to allow ring installation with a low pressure as compared with where no projection is formed on the outer periphery of the flange-shaped portion.

It is preferable that a taper portion which has a reduced inside diameter than the portion on the inlet side is provided on the bottom side of the cover. The ring member is pressed in on the bottom side from a position where the taper starts. Forming the taper portion on the bottom side of the cover can easily press the ring member into the cover.

Other objects and features of the present invention will become more readily apparent from a better understanding of the preferred embodiment described below with reference to the following drawings.

DESCRIPTION OF THE PREFERRED EMBODIMENTS (First Embodiment)

Fist embodiment of this invention will be described with reference to the accompanying drawings.

Figure 1:
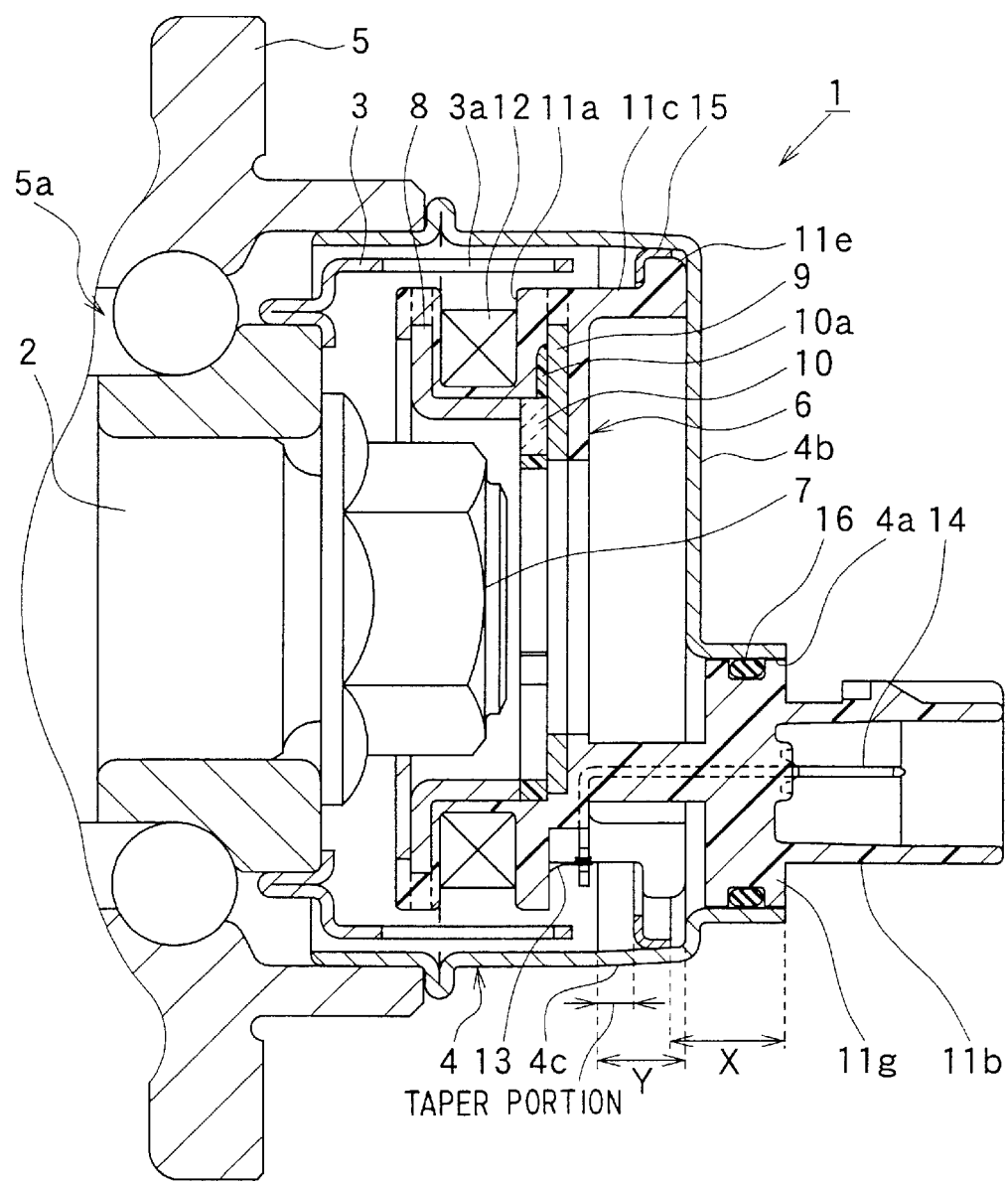
FIG. 1 is a sectional view showing the configuration of the rotation detecting device 1, taken along line IA-O-IB in FIG. 3, of the first embodiment according to this invention.
Figure 2:
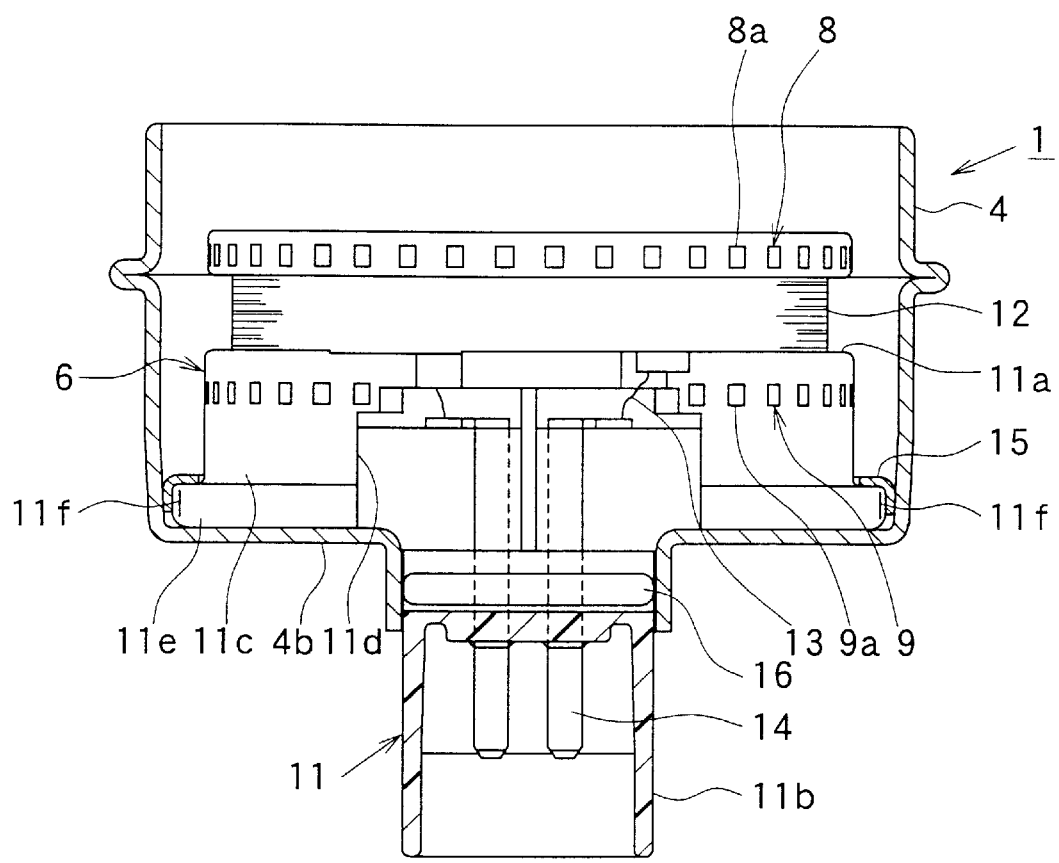
FIG. 2 is a front view, partly broken, of the rotation detecting device shown in FIG. 1.
Figure 3:
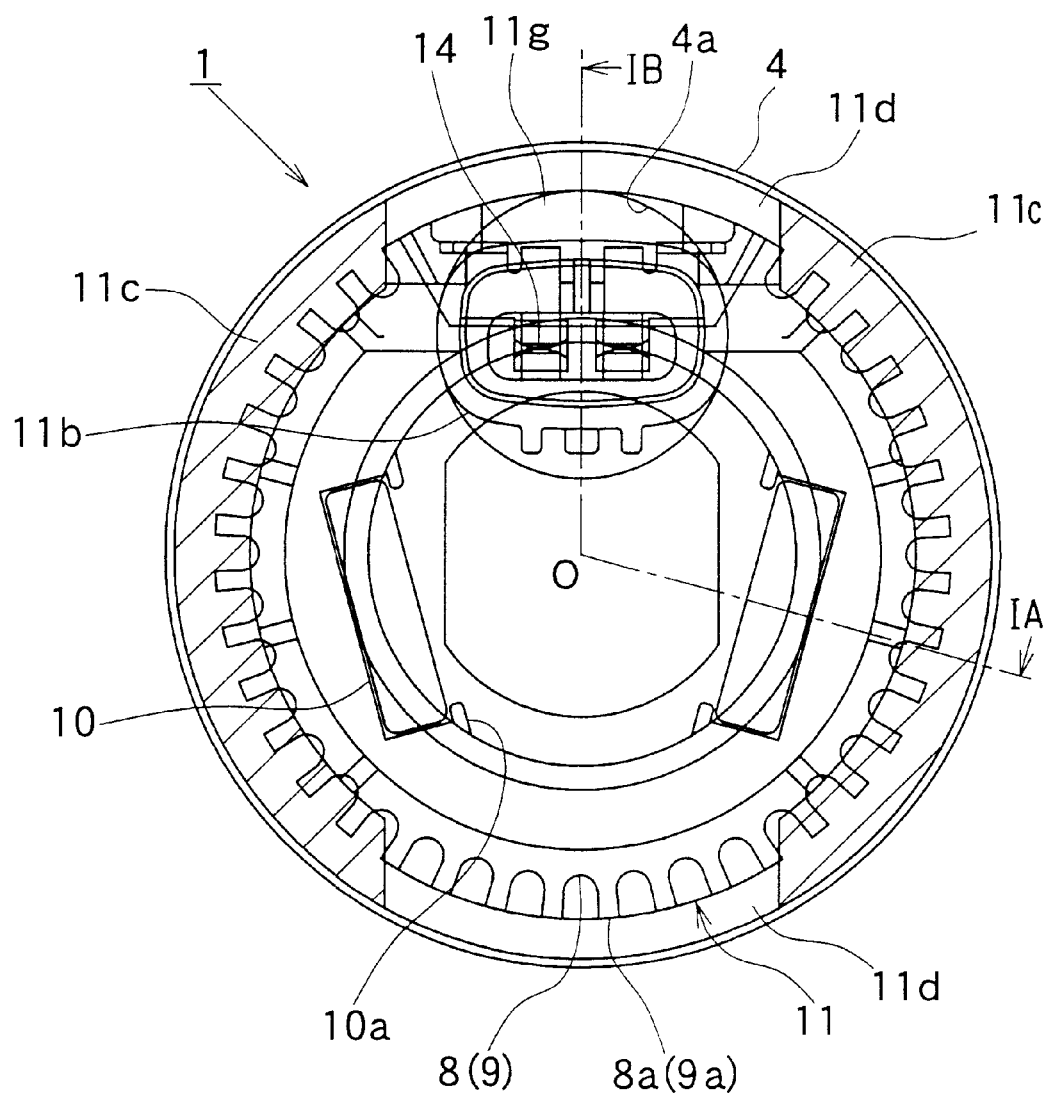
FIG. 3 is a view showing the layout of components of the rotation detecting device shown in FIG. 1.

FIG. 1 is a sectional view showing a mounted state of a rotation detecting device 1 of the first embodiment according to this invention. FIG. 2 is a front view, partly broken, showing the rotation detecting device 1 shown in FIG. 1. FIG. 3 is a view showing the layout of components of the rotation detecting device 1. FIG. 1 shows a section of FIG. 3 taken along line IA-O-IB of FIG. 3. In FIG. 1, an upper side corresponds to an IA side of FIG. 3, and a lower side corresponds to an IB side of FIG. 3. FIG. 2 corresponds to the front view, partly broken, of FIG. 3 as viewed from above. The configuration of the rotation detecting device 1 will hereinafter be explained with reference to FIGS. 1 to 3.

The rotation detecting device 1 is for detecting the rotational speed of a driven wheel secured on a rotating shaft 2 of a vehicle driven wheel (not shown), and is fixedly mounted on a housing 5 provided with a bearing 5a through a metal cover 4 as shown in FIG. 1. In the metal cover 4 is housed a sensor body (detecting section) 6, by which the rotational speed of the rotor 3 is detected.

The rotor is designed to rotate together with the rotating shaft 2, and the sensor body 6 is rotatably supported on the rotating shaft 2 through the bearing 5a, so that the sensor body 6 will not rotate together with the rotating shaft 2 if the rotor 3 rotates together with the rotating shaft 2.

The rotor 3 is of a cylindrical shape formed along the outer periphery of the rotating shaft 2, protruding in a direction of a bearing nut 7. On a projecting portion of the rotor 3 are provided a magnetic column portion (a low magnetic-reluctance portion) and a window portion (a high magnetic-reluctance portion) alternately formed at a predetermined spacing along the direction of rotation of the rotor 3. These portions form a rotary switch section 3a. The column portion and the window portion, together with the sensor body 6, form a closed magnetic circuit to function as a switch which changes the quantity of magnetic flux in the magnetic circuit.

The sensor body 6 is provided with various components to be fitted on the inner periphery side of the rotor switch section 3a.

First core 8 and second core 9 each of which has an outer peripheral portion facing the rotary switch section 3a are mounted coaxially with the rotating shaft 2, and are formed in a disk shape as shown in FIG. 3. In the outer peripheral portions of the first core 8 and the second core 9, magnetic body portions and space portions are continuously formed alternately in the circumferential direction to thereby form projections and depressions. The outer peripheral portions of the first core 8 and the second core 9 constitute a magnetic switch section.

Inside of the first core 8 and the second core 9 is disposed a flat plate-type permanent magnet 10 through a resinous spacer 10a. The first and second cores 8 and 9, permanent magnet 10, and spacer 10a are integrally formed by molding a resin (e.g., polybutylene terephthalate(PBT)). Hereinafter the resinous portion thus molded is called the resin-molded portion 11. Incidentally, the second core 9 may have protrusions, which are formed inside thereof, to fix the magnet 10 in place of the resinous spacer 10a.

Of the resin-molded portion 11, there is formed a slot section 11a of U shape in cross section which is open on the outer peripheral surface side of the resin-molded portion 11. In the slot section 11a is wound the coil 12. Inside the inner peripheral side of the coil 12, a burring-processed part of the first core portion 8 is located. That is, the magnetic circuit is comprised of the first core 8, the second core 9, and the permanent magnet 10. Forward end surfaces 8a and 9a of the outer peripheral portion of the first and second cores 8 and 9, that is, on the opposite surfaces of the rotary switch section 3a, are so constituted as to be exposed from the resin-molded section 11, so that the magnetic flux varies between forward end surfaces 8a and 9a and the rotary switch section 3a.

Furthermore, a terminal 14 which is an output terminal is connected to the coil 12 by soldering through a lead wiring 13. That is, the coil 12 is connected to the outside through the terminal 14. The terminal 14 is also resin-molded together with the first and second cores 8 and 9 stated above, being formed integrally with other components by the resin-molded section 11. The resin-molded section 11 is formed to locally project at the part 11b where the terminal 14 is located, so that the section 11b may operate as a connector. Hereinafter, therefore, this portion 11b is termed the connector portion.

On the outer peripheral portion of the resin-molded section 11 is formed a projecting portion 11c protruding on the bottom side of the metal cover 4 as indicated by the obliquely shaded section in FIG. 3. However, of the outer peripheral portion, the portion where the terminal 14 and the lead wiring 13 are located, and the portion on the opposite side across the center axis of the sensor body, are not projecting and are formed in the shape of the recess 11d. A space is formed in the resin-molded section 11 between the connector portion 11b and the coil 12, in order that the electrical connection portion between the coil 12 and the terminal 14 will be exposed out of the resin-molded section 11.

In the sensor body 6 stated in the present embodiment, the coil 12 is wound in the slot section 11a after injection molding of the resin-molded section 11 having the slot section 11a; and after winding the coil 12, electrical connection between the terminal 14 and the lead wiring 13 is carried out. The connection of the terminal 14 with the lead wiring 13 can easily be performed through the recess 11d (the space) formed in the resin-molded section 11. Of the outer peripheral portion of the resin-mold section 11, the portion where the terminal 14 and the lead wiring 13 are located, and the portion located on the opposite side across the center axis of the sensor body, are formed as the recess 11d. Therefore, there is formed the recess 11d in the radial direction of the sensor body 6 which passes through the connection between the terminal 14 and the lead wiring 13. Consequently, it is possible to insert the connecting tool (not shown) through the recess 11d, thereby allowing the use of the connecting tool for easy electrical connection.

As has been explained above, the first and second cores 8 and 9, the coil 12, the terminal 14, and the permanent magnet 10 are integrally formed by the resin-molded section 11 to thereby constitute the sensor body 6. To cover the sensor body 6 thus constituted, the lid-type metal cover 4 is provided, part of which is fitted in the hole of the housing 5, thereby securing the sensor body 6 to the housing 5.

The sensor body 6 is inserted into the metal cover 4 from the inlet side of the metal cover 4, being fitted and secured to the bottom 4b of the metal cover 4. This securing operation is accomplished by pressing a metal ring member 15 into the metal cover 4 after disposing the ring member 15 on the sensor body 6 at a forward end side in the direction of insertion of the metal cover 4. To be specific, on the bottom 4b side of the metal cover 4, there is provided a taper portion, that is, a smaller inside diameter portion than the inlet side, thereby enabling pressing the ring member 15 on the bottom side after the ring member 15 passes a position at which a taper portion 4c starts. Incidentally, the ring member 15 may be pressed into the metal cover 4 and be fixed to the sensor body 6 after the sensor body 6 is disposed on the bottom side of the metal cover 4.

The ring member 15 is disposed so that, of a projecting portion 11c formed on the resin-molded section 11, the outer periphery of a flange-shaped portion 11e located on the bottom 4b side of the metal cover 4 is enclosed with the ring member 15. The flange-shaped portion 11e, as shown in FIG. 2, has a plurality of projecting portions 11f projecting in the radial direction of the flange-shaped portion 11e. The ring member 15 is attached to the sensor body 6 by pressing the ring member 15 onto the plurality of projecting portions 11f, thereby enabling the insertion of the ring member 15, together with the sensor body 6, into the metal cover 4.

On the other hand, in the metal cover 4 is formed an opening 4a formed in burring process. Fitted in this opening 4a are the terminal 14 and the connector section 11b to allow external connection. In the connector section 11b is formed a portion 11g whose outside diameter is the same as the inside diameter of the opening 4a. The sensor body 6 and the metal cover 4 are positioned by the portion 11g. That is, the metal cover 4 and the sensor body 6, being mutually formed circular, are hard to be positioned in the circumferential direction. However, when the portion 11g of the connector section 11b whose outside diameter is equal to the inside diameter of the opening 4a is inserted into the opening 4a, the metal cover 4 and the sensor body 6 are locked from mutual circumferential movement, thus being positioned. Hereinafter, of the connector section 11b, the portion whose outside diameter is equal to the inside diameter of the opening 4a will be called the positioning portion 11g. In the following explanation, the direction of insertion is meant by the direction of insertion into the metal cover 4.

Moreover, dimensions of each part have been set in order that a relation between distance X from a forward end of the positioning portion 11g in the direction of insertion to a forward end of the ring member 15 in the direction of insertion and distance Y from the inside bottom surface of the bottom 4b of the metal cover 4 to the position where the taper portion 4c starts (the side most removed from the bottom 4b) will be X>Y. By thus setting, the ring member 15 is pressed onto the taper portion 4c of the metal cover 4 after positioning by the positioning portion 11g.

An O-ring 16 mounted on an outer periphery of the positioning portion 11g is for achieving a sealing effect at the opening 4a.

In the rotation detecting device 1 thus configured, the closed magnetic circuit is comprised of the permanent magnet 10, the column portion of the first core 8 and the rotor switch section 3a, the second core 9, and the ring member 13. When the forward end faces 8a and 9a (magnetic switch section) of the first and second cores 8 and 9 meet the window of the rotor switch section 3a, the closed magnetic circuit is cut off simultaneously at two places. Then, electric voltage is produced in the coil 12, which responds to change in quantity of the magnetic flux passing through the closed magnetic circuit. The voltage is transmitted to an analyzing means (not shown) through the terminal 14. At the analyzing means, the rotational speed of the rotating shaft is detected from the state of change in voltage, and the rotational speed of the driven wheel is determined from the result of detection of the rotational speed of the rotating shaft.

The resin-molded section 11 of the rotation detecting device 1 configured as explained above is formed by injection molding after mounting in a predetermined position each of the components (first and second cores 8 and 9, permanent magnet 10, spacer 10a, and terminal 14). To be more specific, after setting a slide mold for molding the groove 11a and the recess 11d on the outer periphery of each component, the upper and lower dies are arranged in the axial direction of the sensor body 6, then molten resin is charged into a vacant section formed by the molds, thereby performing injection molding of the resin-molded section 11. Then, after the formation of the resin-molded section 11, the coil 12 is wound in the slot section 11a to thereby form the sensor body 6.

The coil 12, as described above, is wound after the molding of the resin-molded section 11 and no resin molding is carried out after the winding of the coil 12. There will never arise such a problem in the molding process that a high-temperature, high-pressure mold contacts the coil 12, which, therefore, will never be damaged. Furthermore, it is possible to form the sensor body 6 by a single time of resin molding.

A plurality of projections 11f are formed on the flange-shaped portion 11e of the resin-molded section 11, and the ring member 15 is pressed onto the projections 11f to fix the ring member 15 to the flange-shaped portion 11e of the resin-molded section 11. Therefore, contact area between the ring member 15 and the flange-shaped portion 11e for press-fitting the ring member 15 decreases, thereby allowing press-fitting with a low pressure as compared with the case in which the projections 11f are not formed on the outer periphery of the flange-shaped portion 11e.

Furthermore, since the taper portion 4c is provided on the bottom 4b side of the metal cover 4, the ring member 15 can easily be installed to the metal cover 4 by press-fitting.

(Second Embodiment)

Figure 4:
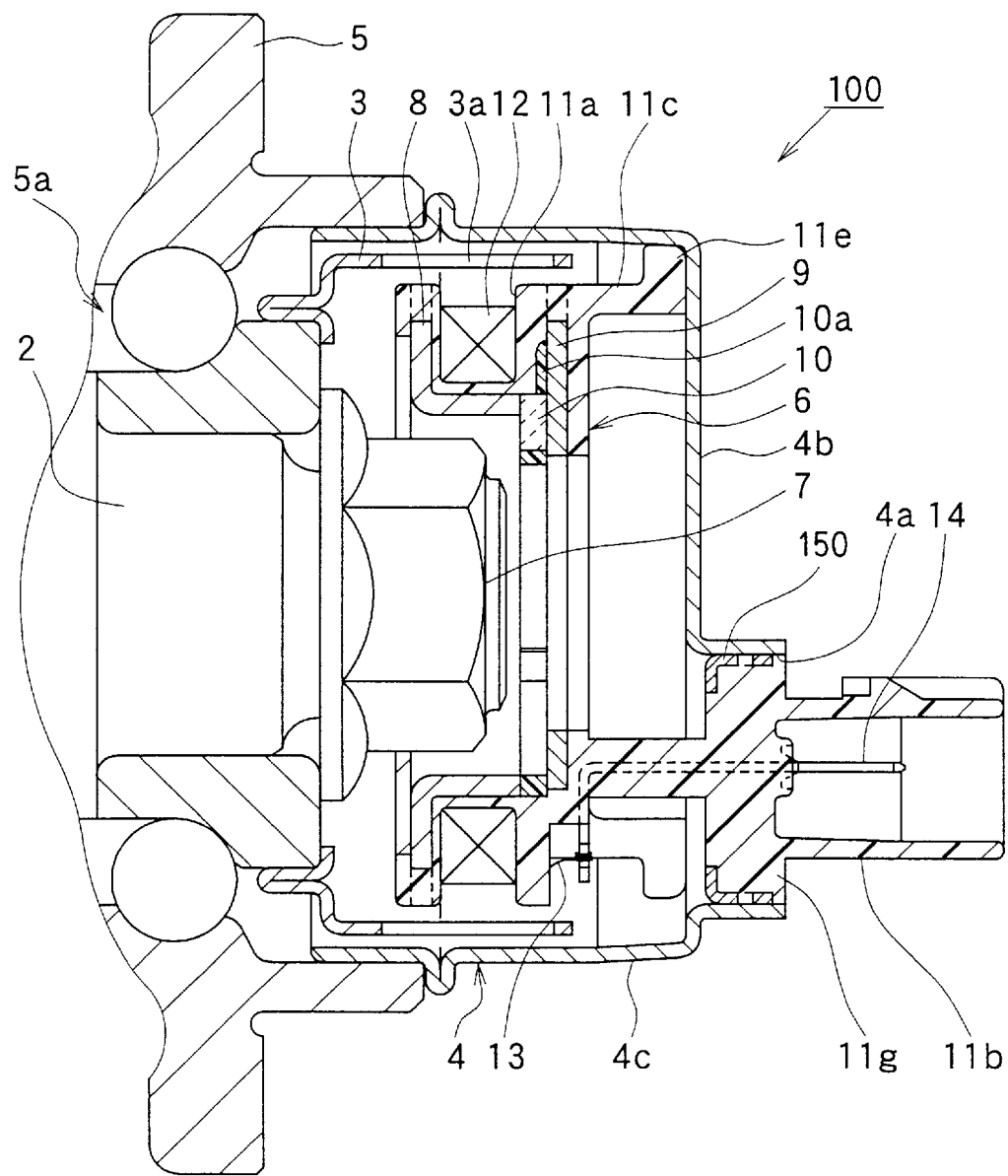
FIG. 4 is a sectional view showing the configuration of the rotation detecting device 1 of the second embodiment according to this invention.

FIG. 4 is a sectional view showing the general configuration of a rotation detecting device 100 in the present embodiment. The rotation detecting device 100 of the present embodiment differs in the configuration of a ring member 150 from the ring member 15 of the first embodiment.

In the first embodiment, the ring member 15 is mounted on the outer periphery of the sensor body 6. In the present embodiment, however, an outside diameter of a positioning portion 11g is equal to an inside diameter of a opening 4a of a metal cover 4 as shown in FIG. 4. On an outer periphery of this positioning portion 11g the ring member 150 is mounted and the positioning portion 11g is installed by press-fitting in the opening 4a, to thereby fix the sensor body 6 to the metal cover 4. The same effect as the first embodiment, therefore, is achievable by the adoption of the above-described configuration.

(Third Embodiment)

Figure 5:
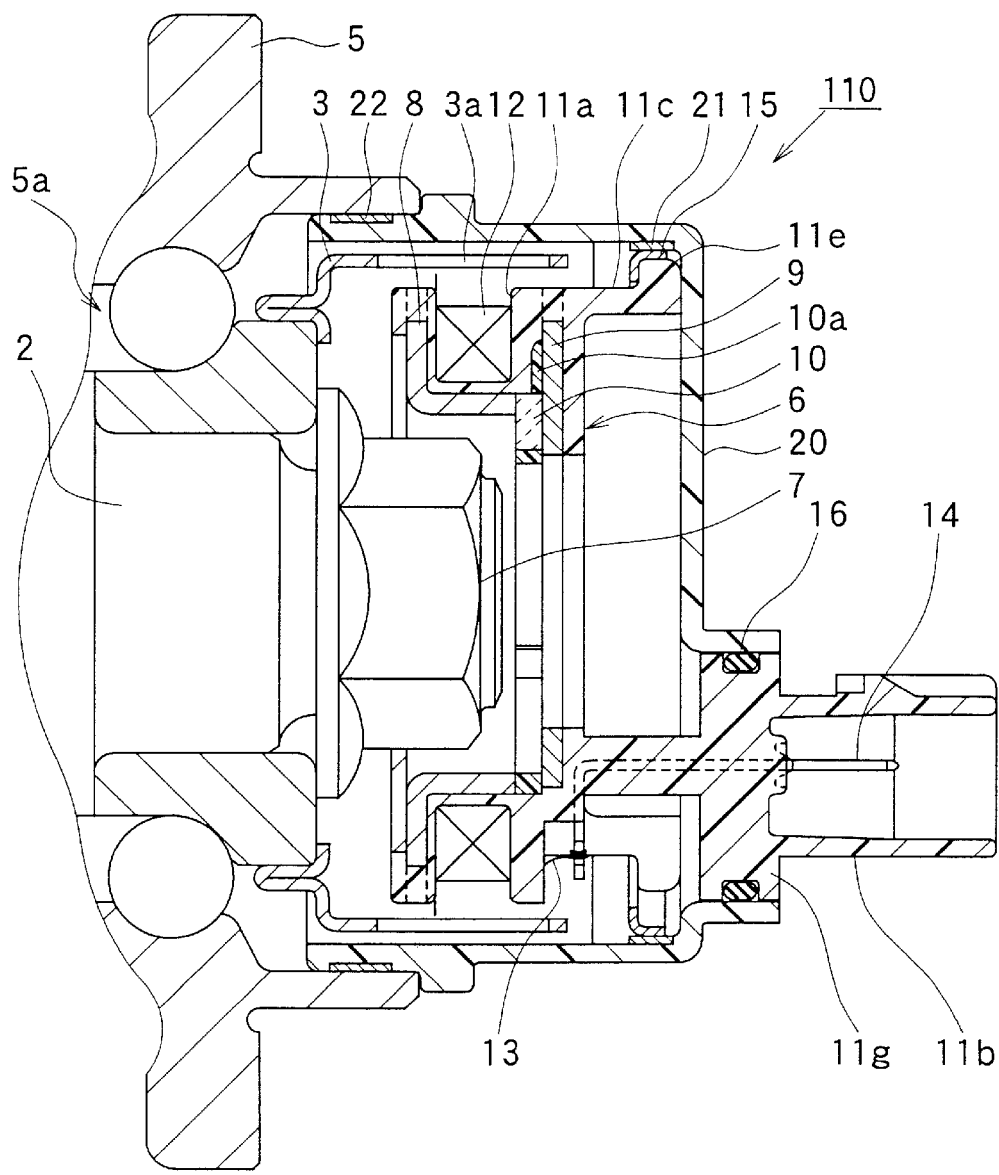
FIG. 5 is a sectional view showing the configuration of the rotation detecting device 1 of the third embodiment according to this invention.

FIG. 5 is a sectional view showing the general configuration of a rotation detecting device 110 according to the present embodiment. As shown in this drawing, shown in the rotation detecting device 1 of the present embodiment is the sensor body 6 housed by the use of a resinous cover 20 in place of the metal cover 4 (shown in FIG. 1) of the first embodiment.

When the rotation detecting device 110 is used, like the vehicle wheel speed sensor, under such a driving environment that noises are likely to be picked up, it is preferable that the sensor body 6 is covered with a metal member for noise prevention. In the first embodiment, the metal cover 4 is used to cover the sensor body 6. However, a wide range of an equipment including the rotation detecting device 1 is covered with a metal member, it is unnecessary to use a metal cover to cover the sensor body 6. The sensor body 6, therefore, may be covered with the resinous cover 20 as previously stated in the present embodiment.

In this case, however, it should be noticed that when the metal ring member 15 is pressed into resinous cover 20, a "creep phenomena" problem will arise because of the metal-to-resin press-fitting. To avoid this problem, therefore, it is advised to pre-fix a metal ring member 21 by insert-molding or bonding to the inner periphery of the resinous cover 20, then to press-fit the ring member 15 thereto.

The resinous cover 20 is also press-fitted and fixed to the housing 5 in a similar manner. Therefore, it is preferred that a metal ring member 22 be mounted on an outer periphery of the resinous cover 20, and the ring member 22 is press-fitted in the housing 5.

In the above-described embodiments, although the sensor body 6 is press-fitted and fixed to the metal cover 4 by the use of the metal ring member 15, the sensor body 6 and the metal cover 4 are not necessarily required to be fixed by press-fitting and may be installed for example by bonding.

In each of the above-described embodiments, the lead wiring 13 is soldered for electrical connection between the coil 12 and the terminal 14. As an alternative, however, fusing may be adopted for electrical conduction by supplying the current to the terminal 14 and the lead wiring 13 after winding the lead wiring 13 to the terminal 14.

What is claimed is:

1. A rotation detecting device, comprising:
a sensor body including:
a magnetic flux path portion for changing a magnetic reluctance by a rotary switch section in which portions of different magnetic reluctance alternately change in response to a rotation of a rotating body to be detected;
a magnet for producing a magnetic flux in the magnetic flux path portion;
an electromagnetic coil for producing voltage in accordance with change in the magnetic flux in the magnetic flux path portion; and
an output terminal having an electrical connection portion for connection with the electromagnetic coil, for leading out the voltage produced by the electromagnetic coil;
a cover formed as a case with a bottom for holding the sensor body; and
a resin-molded section holding the magnetic flux path portion, the magnet, and the output terminal therein, and the resin-molded section having a slot section formed in an outer periphery thereof in which the electromagnetic coil is wound, and a recess portion for exposing the electrical connection portion and in which the electromagnetic coil is electrically connected to the output terminal.

2. A rotation detecting device according to claim 1, wherein the resin-molded section has a connector of a projecting shape, in which the output terminal is located, wherein the connector protrudes from the bottom of the cover; and
wherein the resin-molded section has a projecting portion projecting toward the bottom of the cover, wherein the projecting portion is not formed at a portion where the recess portion is located.

3. A rotation detecting device according to claim 1, wherein the sensor body is press-fitted and secured to the cover.

4. A rotation detecting device according to claim 3, wherein the sensor body is press-fitted to the cover through a metal ring member provided on an outer periphery of the resin-molded section.

5. A rotation detecting device according to claim 4, wherein a flange-shaped portion is formed on the outer peripheral portion of the resin-molded section, which projects from the resin-molded section, and the ring member is disposed on the flange-shaped portion.

6. A rotation detecting device according to claim 5, wherein a plurality of projections are formed on the flange-shaped portion, projecting in a direction of an outer periphery of the flange-shaped portion, and the ring member is contacted to the plurality of projections.

7. A rotation detecting device according to claim 4, wherein the cover further includes:
an inlet portion disposed opposite to the bottom, from which the sensor body is press-fitted; and
a taper portion disposed between the opening portion and the bottom, the taper portion has a smaller inside diameter than that at the inlet portion;
wherein the ring member is press-fitted on a bottom side of the cover apart from a taper start position where the taper portion starts to taper off toward the bottom of the cover so that the ring member is tightly fitted to the cover.

8. A rotation detecting device according to claim 1, wherein the magnetic flux path portion is comprised of disk-shaped first and second cores, and the slot section is located between the first and second cores.

9. A rotation detecting device, comprising:
a rotor; and a stator including a permanent magnet, a magnetic core forming a magnetic circuit with the permanent magnet and the rotor, a coil for generating a signal in response to changes in magnetic flux in the magnetic circuit, an output terminal connected to the coil, and a resin mold embedding the permanent magnet, the magnetic core and the output terminal therein, wherein the resin mold has a slot open to an outside to face the rotor, and the coil is wound in the slot without being covered with the resin mold at a side facing the rotor.

10. A rotation detecting device according to claim 9, wherein the resin mold has a recess open to the outside, and the output terminal and the coil are connected in the recess without being covered with the resin mold.

11. A rotation detecting device comprising:

a rotor; and a stator including a permanent magnet, a magnetic core forming a magnetic circuit with the permanent magnet and the rotor, a coil for generating a signal in response to changes in magnetic flux in the magnetic circuit, and an output terminal connected to the coil, and a resin mold embedding the permanent magnet, the magnetic core and the output terminal therein, wherein the resin mold has a recess open to an outside, and the output terminal and the coil are connected in the recess without being covered with the resin mold at a radial outside of the resin mold.

12. The rotation detecting device of claim 11 wherein the output terminal further includes a connecting portion that is not embedded in the resin mold and that is disposed in the recess, the connecting portion connected to a lead wire from the coil.

* * * * *